United States Patent [19]

Pircher

[11] 4,248,535
[45] Feb. 3, 1981

[54] LASER GYROMETER HAVING THE TWO BEAMS EMERGING FROM THE TWO ENDS OF THE FIBER FORMING TWO ADJACENT LIGHT PARTS OF A SINGLE BEAM

[75] Inventor: Georges Pircher, Paris, France
[73] Assignee: Thomson-CSF, Paris, France
[21] Appl. No.: 58,386
[22] Filed: Jul. 17, 1979
[51] Int. Cl.³ .............................................. G01C 19/64
[52] U.S. Cl. ..................................................... 356/350
[58] Field of Search ............................... 356/350, 351

[56] References Cited
FOREIGN PATENT DOCUMENTS
1298335  6/1969  Fed. Rep. of Germany ............ 356/350

Primary Examiner—Vincent P. McGraw
Attorney, Agent, or Firm—Cushman, Darby & Cushman

[57] ABSTRACT

A laser gyrometer for the measure of the angular speed of a rotating system, comprising an optical fiber wound around the rotation axis, in which two coherent light beams are guided in the direction of the rotation and in the opposite direction, respectively, so as to be subjected to the Sagnac effect. The two beams emerging from the two ends of the fiber are directed along two separate adjacent parts of one beam. Measurement of the phase shift between the two parts is based on the displacement of the center of the diffraction spot obtained in the focal plane of a lens, positioned in the path of the beam.

6 Claims, 4 Drawing Figures

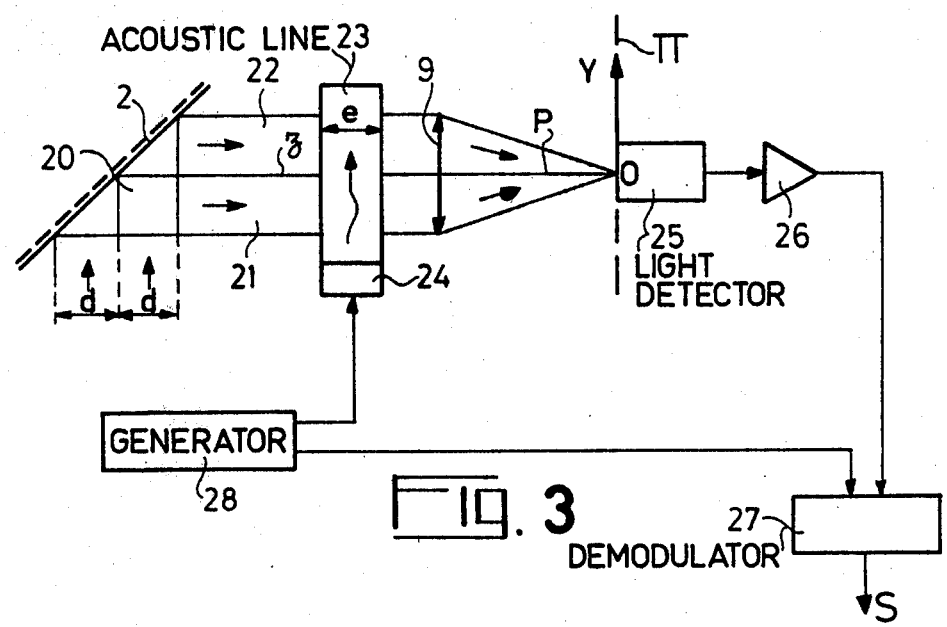
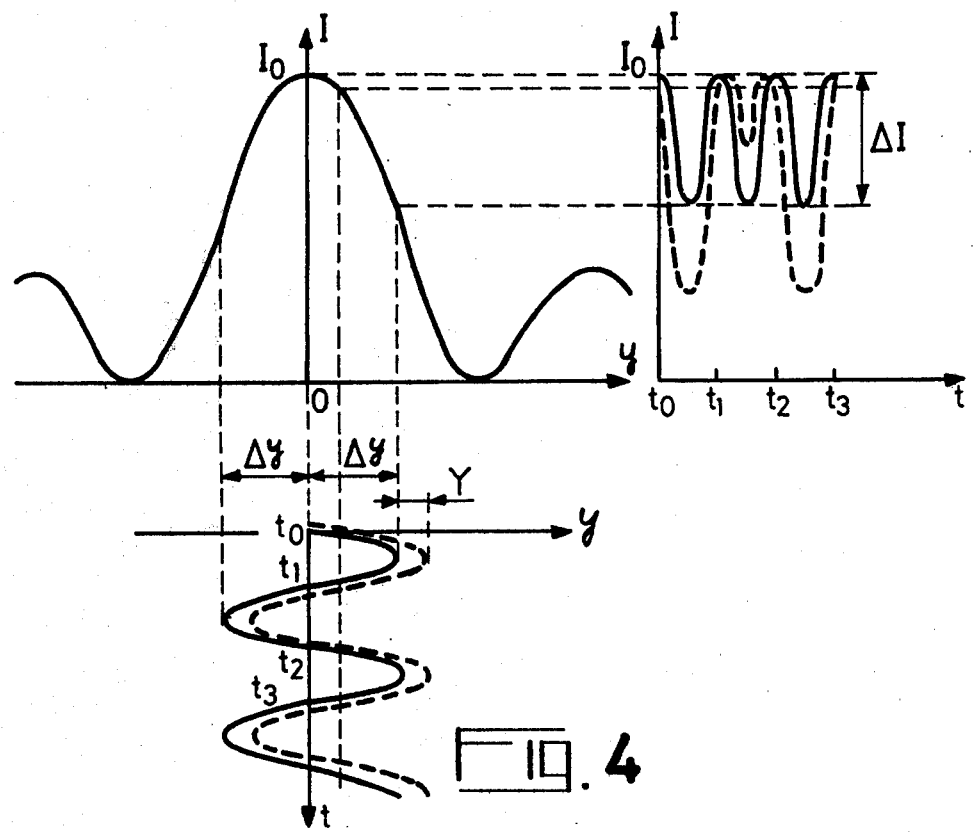

LASER GYROMETER HAVING THE TWO BEAMS EMERGING FROM THE TWO ENDS OF THE FIBER FORMING TWO ADJACENT LIGHT PARTS OF A SINGLE BEAM

BACKGROUND OF THE INVENTION

1. Field of the Invention

This invention relates to laser gyrometers for the determination of the angular speed of a rotating system by measuring the phase-shift between two coherent light beams, guided in a wound optical fibre, in the direction of the rotation, and in the opposite direction respectively.

2. Description of the Prior Art

Such gyrometers generally make an interferometric measurement of the phase-shift, the beams emerging from the two ends of the fibre being recombined, which established and interference state depending upon the angular speed of the system. A quadratic detector collecting this beam supplies an electric signal characteristic of the luminous intensity which is directly related to the phase-shift and hence to the angular speed.

In order to obtain a linear relation between the detected intensity and the phase-shift, a fixed phase-shift of $\pi/2$ is introduced between the two waves. Such a phase-shift is difficult to obtain. Furthermore, the phase-shift related to the rotation is weak and any asymmetry in the arrangement produces parasitic phase-shift of which the thermally or mechanically induces fluctuations create considerable additional noise which gives rise to a loss of sensitivity in the speed measurement. The two light beams intended to enter the two ends of the fibre are obtained by the separation of a single beam issuing from the a laser. The separation and subsequent recombination, after propagation in the fibre, of these two beams is generally obtained by means of a semi-transparent plate of which the transmission and reflection factors are carefully selected.

SUMMARY OF THE INVENTION

The invention enables the disadvantages referred to above to be obviated by a simple device which lends itself to numerous possibilities of improvement in regard to the signal-to-noise ratio and the sensitivity to drifts and fluctuations. Instead of interfermetrically measuring the phase-shift, the Fourier transformation properties of a thin lens are used. Instead of being mixed, the two beams emerging from the fibre are directed in such a way as to follow adjacent parallel paths. They pass through one and the same lens of which the optical axis is situated in the separation plane of the two beams. A detector measures the intensity at the focal point of the lens.

In order to obtain a signal proportional to the phase-shift, an alternate variation in the detected intensity is produced and superimposed upon the fixed variation related to the phase-shift. The gyrometer according to the invention may also include an optical heterodyning facility for reducing the noise inherent in the light detector.

BRIEF DESCRIPTION OF THE DRAWINGS

The invention will be better understood from the following description in conjunction with the accompanying drawings, wherein:

FIG. 3 shows one embodiment of the means for detecting the phase-shift.

FIG. 4 shows curves illustrating the mode of detection.

DESCRIPTION OF THE PREFERRED EMBODIMENT

Figure 1:
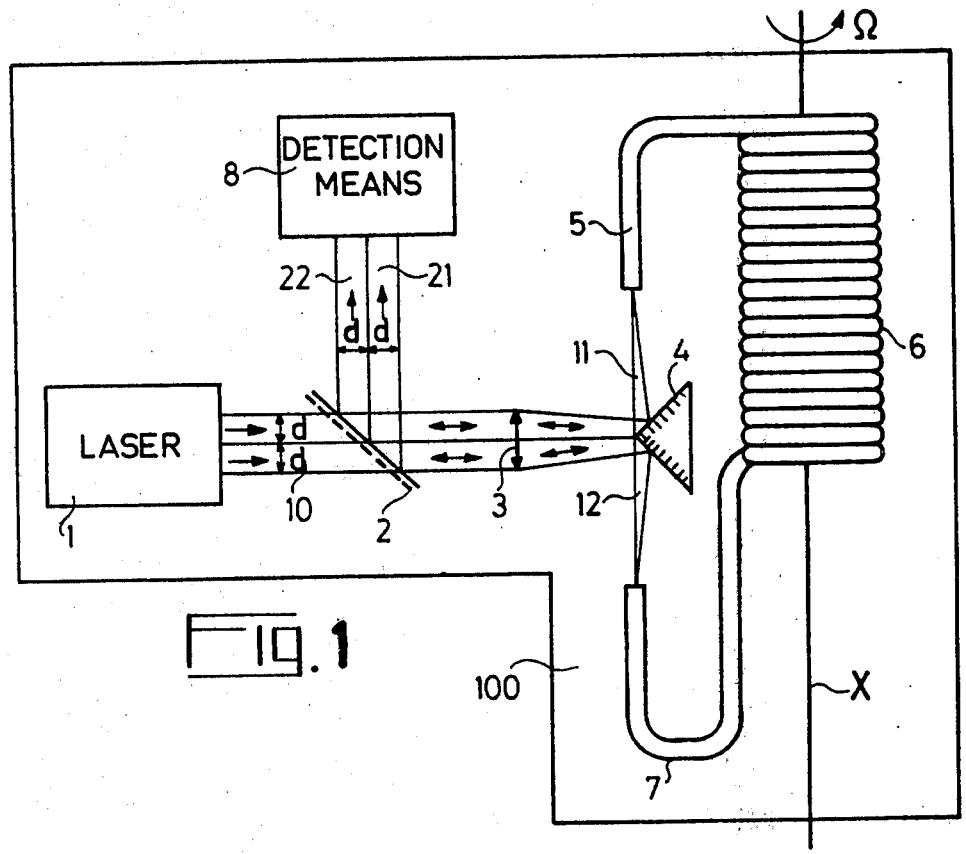
FIG. 1 diagrammatically illustrates a gyrometer according to the invention.

FIG. 1 diagrammatically illustrates a gyrometer according to the invention. The arrangement as a whole is accomodated in a single block 100 which rotates at the speed $\Omega$ about an axis of rotation X. The block 100 comprises a laser source 1 preferably selected to have a wavelength corresponding to a minimum absorption for the optical fibres. This laser emits a monochromatic beam 10 which traverses a semi-transparent plate 2 and which is condensed by a lens 3. The beam 10 is separated into two differently directed beams 11 and 12 by a mirror 4 in the form of a prism of which the peak is situated in the path followed by the central ray of the beam 10. Each of the beams 11 and 12 is directed to one of the ends (5 and 7, respectively) of an optical fibre wound around the axis of rotation X. Thus, the energy of the beams 11 and 12 propagates in opposite directions in the fibre 6 and is collected at the ends 7 and 5, respectively. The mirror 4 reflects the beams emerging from the ends 7 and 5 in the form of beams 21 and 22, respectively, which follow in opposite directions the paths respectively followed by the beams 12 and 11. The beams 21 and 22, which form two adjacent parts of a beam 20, pass through the lens 3 and are reflected by the plate 2 towards detection means 8 which will be described in detail hereinafter. Since the arrangement as a whole is subjected to a rotation of which it is desired to measure the angular speed $\Omega$, the Sagnac effect appears for the beams 11 and 12 travelling through the wound fibre 6. Since these two beams travel in opposite directions, they show a difference in speed proportional to the speed $\Omega$ and to the surface delimited by the path followed by the light in the fibre. The beams 21 and 22, spatially staggered by half the width d of the beam 10 issuing from the laser 1, are phase-shifted. The phase-shift $\phi$ is measured by the detection means 8.

Figure 2:
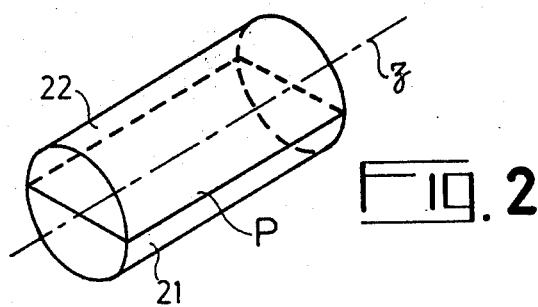
FIG. 2 shows a detail of the light beam to be detected.

A detail of the beam 20 formed by the two parts 21 and 22 after reflection at the plate 2 is shown in FIG. 2. The beam 20 has a circular cross-section and the separation surface of the two parts is a rectangle P. The axis z of the beam 20 is the median axis of the rectangle P.

In order to obtain perfect spatial separation between the beams 21 and 22 and to recover the maximum luminous intensity, it is advisable not only perfectly to centre the mirror 4 but also to select a lens 3 having a numerical aperture equal to that of the fibre 6 and to position the ends 5 and 7, respectively, in the planes conjugate with the focal plane of the lens 3 in relation to the two faces of the mirror 4, the incidence faces of the ends 5 and 7 respectively coinciding with a wave plane of the beams 11 and 12.

FIG. 3 shows the constituent elements of the detection means 8 for determining the phase-shift $\phi$. The beam 20 traverses an acoustic line 23 and is condensed by a lens 9 to form a diffraction spot in the focal plane II of this lens. In the interests of clarity, it will first be assumed that the acoustic line 23 is not excited. Accordingly, it does not have any effect upon the operation of the device. The optical axis of the lens 9 coincides with the axis z of the beam 20.

A light detector 25 is placed in the focal plane II and centred on the axis z. Accordingly, it supplies an electrical signal proportional to the luminous intensity, i.e. to the square of the luminous amplitude, at the point 0 where the axis z intersects the plan II. This signal is then amplified by an amplifier 26 of which the output is connected to a synchronous demodulator 27 of which the function will be described hereinafter in conjunction with that of the acoustic line 23.

When the phase-shift $\phi$ is zero, the beam 20 is an isotropic beam and the diffraction spot obtained in the plane II is that which results from the passage of a plane wave in a circular pupil, i.e. a bright spot centred on the axis, surrounded by equidistant, less and less bright rings. The curve showing the variation in the luminous intensity I as a function of the abscissa on an axis y situated in the plane II, perpendicular to z and perpendicular to the separation plan P is shown in FIG. 4 in the vicinity of the point 0.

When the phase-shift $\phi$ is not zero, the diffraction spot undergoes deformation which, in the vicinity of the point 0, results in a displacement of the central bright spot. The point of maximum intensity is displaced on the axis y by an amount Y which depends upon $\phi$ and the intensity detected at y=0 decreases when the absolute value of $\phi$ increases. This variation in intensity at y=0 is unfortunately very small because the phase-shifts produced are themselves very small. On the other hand, the sign of the phase-shift does not affect this variation intensity. In order to obtain better sensitivity and an indication of the direction of the phase-shift, the acoustic line mentioned above is used. The line 23 is excited by a transducer 24 supplied by a generator 28 which provides a sinusoidal signal of frequency f. This frequency f is selected in dependence upon the characteristics of the constituent material of the line 23 in such a way that the wavelength $\lambda$ of the acoustic wave generated in the material is equal to the diameter of the beam 20:2d. The acoustic line may be used with progressive waves or stationary waves. The following of the description will be confined to the use of stationary waves because the index variations obtained in this way are much higher than those obtained with progressive waves for the same electrical exciting signal. Accordingly, means reflecting the acoustic waves are provided at that end of the line opposite the transducer. The arrangement of the acoustic line 23 in relation to the beam 20 is such that the direction of propagation of the acoustic waves is perpendicular to the surface P, i.e. parallel to the axis y. Since the acoustic wavelength is equal to the width of the beam, a vibration node is obtained at the edges of the beam 20 and on the axis z. The index variations due to the acoustic wave are equal and opposite for two points that are symmetrical in relation to the axis z. For any point of abscissa a on the axis y, the origin being taken on the axis z, the index variation $\delta n$ in relation to the non-operating index $n_0$ varies at the frequency f with the time t: $\delta n = \delta n_0 \sin (2\pi ft) \times \sin$ $$(2 \frac{\pi a}{\lambda}),$$

$\delta n_0$ being the maximum index variation obtained by the acoustic wave. The result of this is a phase-shift of the luminous wave due to the passage in the line:

$$\delta \phi = \frac{2 \pi e}{\frac{\lambda}{n_0}} \times \delta n,$$

$\lambda$ being the wavelength of the light wave. Since this phase-shift varies with the abscissa a, a transformation of the diffraction spot in the plane II is obtained at any instant, similar to the effect produced by a fixed phase-shift $\phi$ between the beams 21 and 22. However, the orders of magnitude are different because the phase-shift $\phi$ is very small (about $10^{-3}$ rad.), whereas the maximal value of the phase-shift $\delta\phi$ produced by the line may be much greater. However, it may be considered that, in this case, too, a displacement is obtained in the maximum of the diffraction curve, as shown at FIG. 4.

In order better to understand the phenomenon, the displacement in the diffraction curve relative to a fixed detector centred on the point 0 may be compared with a displacement of the detector in the plane II, the curve remaining fixed. It can be seen that, when the detector moves, the detected intensity varies. The curves shown in FIG. 4 represent the respective variations as a function of time in the position of the detector on the axis y and in the intensity detected in solid lines for a zero phase-shift $\phi$ and in dotted lines for a non-zero phase-shift $\phi$, the effect attributable to this phase-shift having been greatly exaggerated in the interests of clarity of the Figure. It can be seen from FIG. 4 that, for $\phi=0$, the detector moves symmetrically about the point 0 with an amplitude of movement $\Delta y$ related to $\delta n_0$ and, hence, to the amplitude of the excitation signal coming from the generator 28. For $\phi \neq 0$, the displacement curve obtained is similar to the preceding curve, except that the maximum is different by an amount Y of which the amplitude and the sign depend upon $\phi$. Consequently, for $\phi=0$, there is obtained an intensity variation of amplitude $\Delta I$ at the frequency 2f. The value of $\Delta y$ and, hence, the value of $\Delta I$ may be adjusted through the generator 28. It is preferable to have large intensity variations, for example of the order of Io/2, Io being the value of the maximum of the diffraction curve. For $\phi \neq 0$, the intensity variation is periodic and may be analyzed as the superposition of a continuous component, a component of frequency f, increasing with P, and a component of frequency 2f.

In order to obtain a usuable signal, the signal emitted by the detector 25 is subjected to synchronous detection. The synchronous demodulator 27 suppresses the continuous component of the signal issuing from the amplifier 26 which is proportional to the detected intensity and filtration around the frequency f enables the components which are not situated in a frequency band centred on the frequency f, such as noise and the harmonic components, to be eliminated. The signal obtained is a sinusoidal signal of frequency f. The demodulator 27 also receives a signal issuing from the generator 28 which is in phase with the excitation of the acoustic line, but of which the phase-shift relative to the detected signal depends upon the phase-shift $\phi$. Accordingly, the signal S obtained is a continuous signal which, for fairly small phase-shifts $\phi$, may be proportional to $\phi$. Thus, $\phi$ has been measured with elimination of the high-frequency noise.

The signal-to-noise ratio may be further improved by optical heterodyning, i.e. by mixing the beam 20 which enters the detection means 8 with a light wave having a local oscillation frequency F. It is thus possible to eliminate the so-called "1/f" noise of the light detector 25. The optical frequency F may be created for example by transposing the optical frequency of the laser by means of an acoustic modulator.

What I claim is:

1. A laser gyrometer for the measure of the angular speed of a rotating system, comprising a monomode laser source emitting a monochromatic beam, a light guide wound around the rotation axis, separation means comprising an optical element having two reflecting faces and situated in the path of said monochromatic beam for producing first and second secondary beams and directing said secondary beam towards first and second ends of said light guide, respectively; said optical element further collecting said first and second secondary beams emerging from said second and first ends, respectively, and forming two adjacent light parts of a single beam; said gyrometer further comprising optical detection means for measuring the phase-shift between said two parts produced by said rotation.

2. A gyrometer as claimed in claim 1, wherein said optical element is in the form of a prism of which the edge between said two reflecting faces is situated in a median plane of said monochromatic beam; said gyrometer further comprising collimating means situated in the path of said secondary beams for forming parallel adjacent light parts.

3. A gyrometer as claimed in claim 2, wherein said detection means comprise a lens placed in the path followed by said two light parts and a light detector situated in the focal plane of said lens.

4. A gyrometer as claimed in claim 3, wherein said detection means further comprise acousto-optical means positioned in the path followed by said two light parts in the vicinity of the pupil of said lens for producing periodic phase-shifts between said two light parts at a predetermined frequency f; said detection means further comprising synchronous demodulation means for supplying an indication of the value and the direction of the phase-shift produced by said rotation.

5. A gyrometer as claimed in claim 4, wherein said acousto-optical means comprise an acoustic line, an acoustic wave transducer positioned at one end of said line and a generator supplying a signal of frequency f for exciting said transducer so as to produce acoustic vibrations in phase opposition in the two parts of the acoustic line respectively traversed by said two light parts.

6. A gyrometer as claimed in claim 5, wherein said acoustic line is provided with reflecting means positioned at that end of the line which is opposite said transducer, for creating a stationnary wave state.

* * * * *

UNITED STATES PATENT AND TRADEMARK OFFICE
CERTIFICATE OF CORRECTION

PATENT NO. : 4,248,535
DATED : February 3, 1981
INVENTOR(S) : Pircher

It is certified that error appears in the above—identified patent and that said Letters Patent is hereby corrected as shown below:

ON THE TITLE PAGE

Priority information should read:

--French Patent Application 7821713, filed July 21, 1978--

Signed and Sealed this

Twenty-sixth Day of May 1981

[SEAL]

Attest:

RENE D. TEGTMEYER

Attesting Officer

Acting Commissioner of Patents and Trademarks